United States Patent
Suomela et al.

(10) Patent No.: US 7,304,585 B2
(45) Date of Patent: Dec. 4, 2007

(54) INITIATION OF ACTIONS WITH COMPRESSED ACTION LANGUAGE REPRESENTATIONS

(75) Inventors: Hartti Suomela, Espoo (FI); Akseli Anttila, Helsinki (FI); Oleg Beletski, Espoo (FI); Ingrid Schembri, Vantaa (FI); Petteri J. Saarinen, Helsinki (FI); Jukka Heinonen, Helsinki (FI); Tony Niklas von Knorring, Helsinki (FI)

(73) Assignee: Nokia Corporation, Espoo (FI)

( * ) Notice: Subject to any disclaimer, the term of this patent is extended or adjusted under 35 U.S.C. 154(b) by 452 days.

(21) Appl. No.: 10/882,619

(22) Filed: Jul. 2, 2004

(65) Prior Publication Data

US 2006/0002610 A1 Jan. 5, 2006

(51) Int. Cl.
*G08C 19/00* (2006.01)
*G08B 13/14* (2006.01)
*G06F 17/00* (2006.01)
*H04M 1/64* (2006.01)

(52) U.S. Cl. ............... 340/825.69; 340/572; 340/10.1; 340/10.5; 235/375; 235/376; 379/88.1; 710/68

(58) Field of Classification Search ........... 340/825.69, 340/572, 10.1, 10.5; 235/375, 376; 379/88.1; 710/68
See application file for complete search history.

(56) References Cited

U.S. PATENT DOCUMENTS

| | | | |
|---|---|---|---|
| 3,916,160 A | 10/1975 | Russo et al. | |
| 3,971,917 A | 7/1976 | Maddox et al. | |
| 4,692,603 A | 9/1987 | Brass et al. | |
| 4,728,783 A | 3/1988 | Brass et al. | |
| 4,745,269 A | 5/1988 | Van Gils | |
| 4,754,127 A | 6/1988 | Brass et al. | |
| 4,782,221 A | 11/1988 | Brass et al. | |
| 4,794,239 A | 12/1988 | Allais | |
| 4,874,936 A | 10/1989 | Chandler et al. | |
| 4,896,029 A | 1/1990 | Chandler et al. | |
| 4,924,078 A | 5/1990 | Sant'Anselmo et al. | |

(Continued)

FOREIGN PATENT DOCUMENTS

DE    10042914    4/2001

(Continued)

OTHER PUBLICATIONS

"*CodeXML Router—Bluetooth Edition*", http//www.gocode.com/products/coderouter.htm, 2 pages, printed on Jul. 2, 2004.

(Continued)

*Primary Examiner*—Jeffery Hofsass
*Assistant Examiner*—Scott Au
(74) *Attorney, Agent, or Firm*—Morgan & Finnegan LLP (57) ABSTRACT

A device stores one or more compression rules for an action language. Upon receipt of a signal from a tag (such as an RFID tag, a visual tag, or an audio tag), a compressed data stream corresponding to the tag is decoded from the signal. Based on the one or more compression rules, one or more action parameters are derived from the compressed data stream. With these parameters, a corresponding action is performed. The action may include communicating across a wireless communications network as well as obtaining content from a remote content provider. Also the action may include storing data, such as a contact entry, or a calendar event.

25 Claims, 6 Drawing Sheets

U.S. PATENT DOCUMENTS

| | | |
|---|---|---|
| 4,939,354 A | 7/1990 | Priddy et al. |
| 4,958,064 A | 9/1990 | Kirkpatrick |
| 4,972,475 A | 11/1990 | Sant'Anselmo |
| 4,998,010 A | 3/1991 | Chandler et al. |
| 5,053,609 A | 10/1991 | Priddy et al. |
| 5,118,369 A | 6/1992 | Shamir |
| 5,124,536 A | 6/1992 | Priddy et al. |
| 5,153,148 A | 10/1992 | Batterman et al. |
| 5,189,292 A | 2/1993 | Batterman et al. |
| 5,206,490 A | 4/1993 | Petigrew et al. |
| 5,223,701 A | 6/1993 | Batterman et al. |
| 5,243,655 A | 9/1993 | Wang |
| 5,250,789 A | 10/1993 | Johnsen |
| 5,331,176 A | 7/1994 | Sant'Anselmo et al. |
| 5,369,261 A | 11/1994 | Shamir |
| 5,378,883 A | 1/1995 | Baterman et al. |
| 5,412,193 A | 5/1995 | Swartz et al. |
| 5,415,167 A | 5/1995 | Wilk |
| 5,449,895 A | 9/1995 | Hecht et al. |
| 5,478,989 A | 12/1995 | Shepley |
| 5,508,695 A | 4/1996 | Nelson et al. |
| 5,512,739 A | 4/1996 | Chandler et al. |
| 5,521,372 A | 5/1996 | Hecht et al. |
| 5,550,535 A | 8/1996 | Park |
| 5,559,707 A | 9/1996 | DeLorme et al. |
| 5,561,702 A | 10/1996 | Lipp et al. |
| 5,561,705 A | 10/1996 | Allard et al. |
| 5,572,653 A | 11/1996 | DeTemple et al. |
| 5,581,630 A * | 12/1996 | Bonneau, Jr. ............... 382/116 |
| 5,591,956 A | 1/1997 | Longacre, Jr. et al. |
| 5,592,375 A | 1/1997 | Salmon et al. |
| 5,612,524 A | 3/1997 | Sant'Anselmo et al. |
| 5,629,981 A | 5/1997 | Nerlikar |
| 5,630,068 A | 5/1997 | Vela et al. |
| 5,642,203 A | 6/1997 | Sawano et al. |
| 5,642,303 A | 6/1997 | Small et al. |
| 5,649,114 A | 7/1997 | Deaton et al. |
| 5,649,187 A | 7/1997 | Hornbuckle |
| 5,666,214 A | 9/1997 | MacKinlay et al. |
| 5,682,142 A | 10/1997 | Loosmore et al. |
| 5,715,314 A | 2/1998 | Payne et al. |
| 5,729,697 A | 3/1998 | Schkolnick et al. |
| 5,732,229 A | 3/1998 | Dickinson |
| 5,764,736 A | 6/1998 | Shachar et al. |
| 5,764,739 A | 6/1998 | Patton et al. |
| 5,794,142 A | 8/1998 | Vanttila et al. |
| 5,799,091 A | 8/1998 | Lodenius |
| 5,811,776 A | 9/1998 | Liu |
| 5,821,513 A | 10/1998 | O'Hagan et al. |
| 5,850,187 A | 12/1998 | Carrender et al. |
| 5,886,646 A | 3/1999 | Watanabe et al. |
| 5,929,778 A * | 7/1999 | Asama et al. ............ 340/10.51 |
| 5,933,829 A | 8/1999 | Durst et al. |
| 5,948,040 A | 9/1999 | DeLorme et al. |
| 5,949,335 A | 9/1999 | Maynard |
| 5,959,530 A | 9/1999 | Lupien, Jr. et al. |
| 5,970,469 A | 10/1999 | Scroggie et al. |
| 5,978,773 A | 11/1999 | Hudetz et al. |
| 5,979,757 A | 11/1999 | Tracy et al. |
| 6,019,449 A | 2/2000 | Bullock et al. |
| 6,023,241 A | 2/2000 | Clapper |
| 6,026,375 A | 2/2000 | Hall et al. |
| 6,029,064 A | 2/2000 | Farris et al. |
| 6,039,430 A | 3/2000 | Helterline et al. |
| 6,055,442 A | 4/2000 | Dietrich |
| 6,058,304 A | 5/2000 | Callaghan et al. |
| 6,108,656 A | 8/2000 | Durst et al. |
| 6,138,009 A | 10/2000 | Birgerson |
| 6,154,745 A | 11/2000 | Kari et al. |
| 6,176,427 B1 | 1/2001 | Antognini et al. |
| 6,177,860 B1 | 1/2001 | Cromer et al. |
| 6,196,466 B1 * | 3/2001 | Schuessler ............... 235/494 |
| 6,199,048 B1 | 3/2001 | Hudetz et al. |
| 6,223,988 B1 | 5/2001 | Batterman et al. |
| 6,249,226 B1 | 6/2001 | Harrison et al. |
| 6,259,367 B1 | 7/2001 | Klein |
| 6,295,506 B1 | 9/2001 | Heinonen et al. |
| 6,308,203 B1 | 10/2001 | Itabashi et al. |
| 6,311,058 B1 * | 10/2001 | Wecker et al. ............ 455/418 |
| 6,312,106 B1 | 11/2001 | Walker et al. |
| 6,314,457 B1 | 11/2001 | Schena et al. |
| 6,327,570 B1 | 12/2001 | Stevens |
| 6,332,062 B1 | 12/2001 | Phillips et al. |
| 6,356,543 B2 | 3/2002 | Hall et al. |
| 6,370,389 B1 | 4/2002 | Isomursu et al. |
| 6,389,278 B1 | 5/2002 | Singh |
| 6,397,057 B1 | 5/2002 | Malackowski et al. |
| 6,401,085 B1 | 6/2002 | Gershman et al. |
| 6,446,004 B1 | 9/2002 | Cao et al. |
| 6,446,208 B1 | 9/2002 | Gujar et al. |
| 6,448,979 B1 | 9/2002 | Schena et al. |
| 6,456,039 B1 | 9/2002 | Lauper et al. |
| 6,462,660 B1 | 10/2002 | Cannon et al. |
| 6,470,096 B2 | 10/2002 | Davies et al. |
| 6,491,217 B2 | 12/2002 | Catan |
| 6,494,562 B1 | 12/2002 | Walker et al. |
| 6,512,919 B2 | 1/2003 | Ogasawara |
| 6,542,933 B1 | 4/2003 | Durst, Jr. et al. |
| 6,577,901 B2 | 6/2003 | Thompson |
| 6,587,684 B1 | 7/2003 | Hsu et al. |
| 6,611,673 B1 | 8/2003 | Bayley et al. |
| 6,622,017 B1 | 9/2003 | Hoffman |
| 6,641,051 B1 | 11/2003 | Illowsky et al. |
| 6,647,269 B2 | 11/2003 | Hendrey et al. |
| 6,650,761 B1 | 11/2003 | Rodriquez et al. |
| 6,678,425 B1 | 1/2004 | Flores et al. |
| 6,687,793 B1 | 2/2004 | Thomas et al. |
| 6,753,883 B2 | 6/2004 | Schena et al. |
| 6,996,537 B2 | 2/2006 | Minear et al. |
| 7,135,976 B2 * | 11/2006 | Neff et al. ............... 340/572.1 |
| 2003/0191839 A1 | 10/2003 | Seljeseth |
| 2004/0000585 A1 | 1/2004 | Silverbrook et al. |
| 2004/0033798 A1 | 2/2004 | Robin et al. |
| 2004/0083138 A1 | 4/2004 | Silverbrook et al. |
| 2004/0087273 A1 * | 5/2004 | Perttila et al. ............ 455/41.2 |
| 2004/0203693 A1 | 10/2004 | Mehta et al. |

FOREIGN PATENT DOCUMENTS

| | | |
|---|---|---|
| EP | 0801512 | 10/1997 |
| EP | 0853287 | 7/1998 |
| EP | 1059599 | 12/2000 |
| EP | 1130495 | 9/2001 |
| EP | 1130933 | 9/2001 |
| EP | 1 197 905 A2 | 4/2002 |
| FI | 2002/2288 | 12/2002 |
| GB | 2 246 491 A | 1/1992 |
| KR | 2002-0043631 | 6/2002 |
| KR | 2002-0080162 | 10/2002 |
| RU | 2 116 008 C1 | 7/1998 |
| WO | WO 97/10558 | 3/1997 |
| WO | WO 97/17790 | 5/1997 |
| WO | WO 97/28736 | 8/1997 |
| WO | WO 97/41654 | 11/1997 |
| WO | WO 97/46960 | 12/1997 |
| WO | WO 98/35469 | 8/1998 |
| WO | WO 99/17230 | 4/1999 |
| WO | WO 99/30257 | 6/1999 |
| WO | WO 00/16507 | 3/2000 |
| WO | WO 00/62260 A1 | 10/2000 |
| WO | WO 01/06507 | 1/2001 |
| WO | WO 01/17297 | 3/2001 |
| WO | WO 01/20542 | 3/2001 |
| WO | WO 01/25985 | 4/2001 |

| WO | WO 01/39103 | 5/2001 |
| WO | WO 01/39108 | 5/2001 |
| WO | WO 01/45038 | 6/2001 |
| WO | WO 01/45061 A2 | 6/2001 |
| WO | WO 01/45319 | 6/2001 |
| WO | WO 01/47291 | 6/2001 |
| WO | WO 01/73687 | 10/2001 |
| WO | WO 01/74011 A1 | 10/2001 |
| WO | WO 01/74406 | 10/2001 |
| WO | WO 01/75815 A2 | 10/2001 |
| WO | WO 01/99410 | 12/2001 |
| WO | WO 02/07474 A1 | 1/2002 |
| WO | WO 02/33669 A1 | 4/2002 |
| WO | WO 2004/003829 | 1/2004 |
| WO | WO 2004/027689 | 4/2004 |
| WO | WO2005/101337 A1 | 10/2005 |

OTHER PUBLICATIONS

"CodeXML Bluetooth Modem", product sheets (2 pp), printed from www.gocode.com on Jul. 2, 2004.
"CodeXML Router—Bluetooth Edition", product sheets (2 pp), printed from www.gocode.com on Jul. 2, 2004.
"Code Router BE Diagram", http://www.gocode.com/routerdiagram.htm, 1 page, printed on Jul. 2, 2004.
"CodeXML Maker Pro", http://www.gocode.com/products/maker.htm, 1 page, printed on Jul. 2, 2004.
"CodeXML Maker Pro Screen", http://www.gocode.com/products/images/makerpro-screen.jpg, 1 page, printed on Jul. 2, 2004.
"CodeXML Bluetooth Modem", http://www.gocode.com/products/modem.htm, 1 page, printed on Jul. 2, 2004.
"Code Router BE Use Case Diagram", http://www.gocode.com/routerdiagram2.htm, 1 page, printed on Jul. 2, 2004.
"GoCode—Secure Data Solutions", http://www.gocode.com/products/gocode.htm, 3 pp, printed on Jul. 2, 2004.
NeoMedia Technologies Inc., "Patent Infringement Lawsuit Brought by Neomedia Against AirClic Inc., Scanbuy, Inc., and LScan Technologies Inc.", dated Jan. 26, 2004, 2 pages, http://www.neom.com/corporate/press/2004/20040126.jsp, printed Apr. 15, 2004.
Symbol Technologies Ltd., "Solutions 8 Fastfrog Case Study", http://www.symbol.com/uk/News/solutions_8_fastfrog_case_stud.html, 2 pages, printed on Apr. 15, 2004.
"CueCat Barcode scanner from Digital Convergence Information", http://www.cuecat.com, 2 pages, printed on Sep. 16, 2005.
iTCaseStudies.com "Uniting Space and Place for Future Growth", 4 pages, http://www.itcasestudies.com/case/ret37.html, printed on Apr. 15, 2004.
Stephen Satchell, "CueCat Principles of Operation", 4 pages, http://www.fluent-access.com/wtpapers/cuecat, printed on Apr. 15, 2004.
Symbol Technologies, Inc. "Symbol Technologies' Consumer Scanners Provide Mall Shoppers With Internet Shopping Experience", dated Dec. 6, 1999, 3 pages, http://www.symbol.com/news/pressreleases/press_releases_retail_consumer.html, printed on Apr. 15, 2004.
NeoMedia Technologies, "Virgin Entertainment, Virgin Megastore Online and Virgin Mega Store Are Charged with Patent Infringement by NeoMedia Technologies, Inc.", dated Jan. 5, 2004, 2 pages, http://www.neom.com/corporate/press/2004/20040105.jsp, printed on Apr. 15, 2004.
12snap UK Ltd. "12snap That's Mobile Marketing", 38 pages, http://www.12snap.com/uk/index2.html, printed on Apr. 15, 2004.
"vCard: The Electronic Business Card", Version 2.1, www.imc.org/pdi/vcardwhite.html, Download Date Feb. 5, 2002, 5 pages.
"vCard Overview", www.imc.org/pdi/vcardoverview.html, Download Date Feb. 5, 2002, 3 pages.
"Products Using vCard and vCalendar Technology", www.imc.org/pdi/pdiprodslist.html, Download Date Feb. 5, 2002, 9 pages.
Mandato D. et al., "CAMP: A Context-Aware Mobile Portal", IEEE Communications Magazine, vol. 40, No. 1, Jan. 2002, pp. 2, 4 and 90-97.
Electronic User's Guide for Nokia 6310i, 9354260, Issue 1, 2002, pp. 1-117.
"Radio Frequency Identification RFID—A Basic Primer", Automatic Identification Manufacturers (AIM) Inc. White Paper, Ver. 1.2, AIM Inc WP-98/002R2, Aug. 23, 2001, pp. 1-17.
"UMTS and Mobile Computing"; Alexander Joseph Huber & Josef Franz Huber., Mar. 2002, Artech House Mobile Communication Series; pp. 170-187 and 231-232.
Aim White Paper: "Introduction to Radio Frequency Identification (RFID)—A Basic Primer", The Association of the Automatic Identification and Data Capture Industry, [Online] Aug. 23, 2001, pp. 1-17; http://www.aimglobal.org/technologies/rfid/resources/RFIDPrimer.pdf>.

* cited by examiner

INITIATION OF ACTIONS WITH COMPRESSED ACTION LANGUAGE REPRESENTATIONS

FIELD OF THE INVENTION

The present invention relates to the representation of actions and data in a dense format. In addition, the present invention relates to the initiation of actions in communications devices.

BACKGROUND OF THE INVENTION

Visual tags, such as barcodes, can be used to store information in the form of bits that are encoded into corresponding visual elements. Such stored information may include data that define one or more actions to be performed by a mobile device. In addition, this stored information may include error correction information and/or error detection information (e.g., checksums).

A mobile device having an image sensor (for example, a camera phone) can read a visual tag's information and carry out the actions defined by this information. Visual tags are not the only articles that may trigger a mobile device's actions. In a similar manner, radio frequency identification (RFID) tags, audio streams (also called audio tags), watermarks in visual media, and the like can be used to trigger actions in mobile devices with corresponding sensors.

Such tag-initiated actions can be, for example, instructions regarding the storage of calendar events, contact information, or other information in the device's memory. In addition, examples of tag-initiated actions include launching an external communications connection (e.g., placing a phone call, sending an SMS message, initiating a wireless application protocol session, or establishing a web connection). Also, tag-initiated actions may include a device launching an application and passing tag-originated parameters to the application. Further, such actions may result in the mobile device obtaining services or content from remote providers.

The triggering of such actions in mobile devices can be achieved by encoding the action defining data according to a language developed for that particular purpose. Such languages (referred to herein as action languages) define how particular actions are indicated and how the data is to be interpreted.

The amount of information that a tag may store is often limited. For instance, the number of bits expressed in a visual tag determines the visual tag's physical size. However, this size cannot become too large because limits exist in the size of most associated media channels (e.g., space available in a newspaper advertisement). Audio tags are similarly constrained as the transmission speed of an audio channel is relatively low due to noisy environments. Therefore, it is desirable for such action languages to minimize the number of symbols (e.g., bits) required to express the action.

Archiver data compression techniques, such as zip, arj, and lhz, compress data by identifying data sequence patterns and replacing them with indices from a compression dictionary. However, such compression techniques are not suitable for small amounts of data, at least because the compression dictionary must accompany the compressed data. Thus, the employment of such compression techniques with tags may result in "compressed data" that is actually larger than the original data.

Also several languages exist for inputting data into mobile devices. VCal and VCard are examples of such languages. However, these textual languages are quite verbose and do not provide for efficient information storage in tags. An additional example of such languages is the wireless application protocol (WAP) binary extensible markup language (XML). This language merely defines compacting methods for data identifiers. In other words, it replaces the long, textual parameter and action titles with shorter titles. However, this language does not compress the parameters themselves.

SUMMARY OF THE INVENTION

The present invention provides a method, system, and computer program product that stores one or more compression rules for an action language and receives a signal from a tag (such as an RFID tag, a visual tag, or an audio tag). In addition, the method, system, and computer program product decode from the signal a compressed data stream corresponding to the tag. Based on the one or more compression rules, one or more action parameters are derived from the compressed data stream. With these parameters, a corresponding action is performed.

The one or more compression rules may include at least one of: using short identifiers, storing data in a compact format, using fixed data structures, and using references. The action may include communicating across a wireless communications network as well as obtaining content from a remote content provider. Also the action may include storing data, such as a contact entry, or a calendar event.

According to a further aspect of the present invention, a method encodes an action into a compact representation according to an action language, which employs one or more of using short identifiers, storing data in a compact format, using fixed data structures, and using references. In addition, the method stores the compact representation in a tag. According to another aspect, an apparatus includes an encoder for encoding an action into a compact representation according to an action language, and a generator for storing the compact representation in a tag. In yet a further aspect of the present invention, a tag includes a compact representation of an action;

The present invention provides for the compact representation of actions in tags. Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
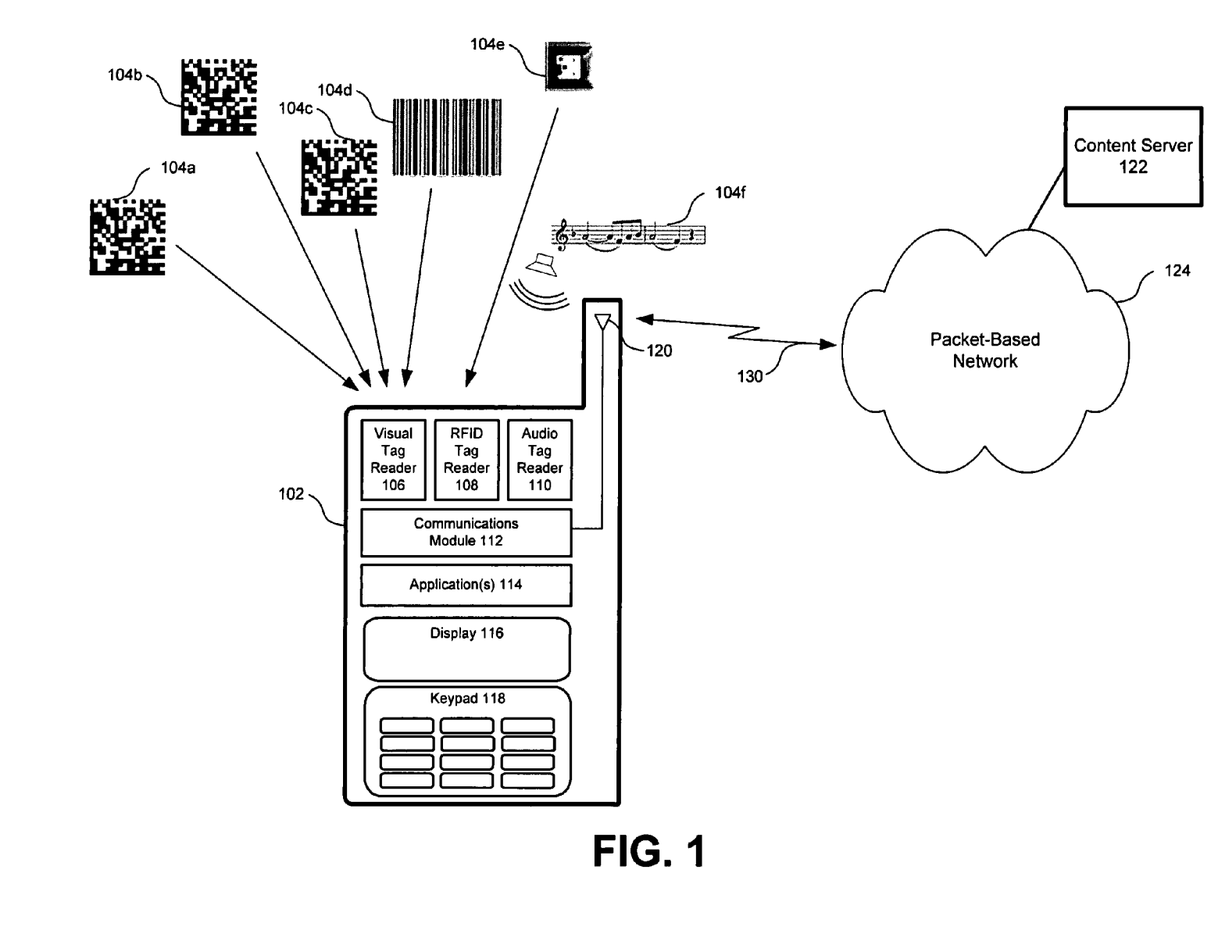
FIG. 1 is a diagram of an exemplary operational environment.

Before describing the invention in detail, it is helpful to first describe an environment in which the invention may be used. Accordingly, FIG. 1 is a diagram of an exemplary operational environment in which a wireless communications device (WCD) 102 may receive information from various tags 104. As a result of this received information, WCD 102 may perform various actions.

WCD 102 is a portable device having wireless communications capabilities. For example, WCD 102 may be a mobile telephone, or a personal digital assistant (PDA) with wireless communications capabilities. As shown in FIG. 1, WCD 102 may include one or more of various tag readers. Examples of such readers include a visual tag reader 106, an RFID tag reader 108, and an audio tag reader 110.

In addition, WCD 102 includes a communication module 112 and one or more applications 114. Communications module 112 provides for the exchange of information across one or more wireless communications networks. Such networks may be cellular (e.g., GSM based) or short-range, such as IEEE 802.11 wireless local area networks (WLANs) and Bluetooth networks This exchange may involve the transmission and reception of RF signals 130 through an antenna 120.

Such wireless communications networks may provide access to various resources. For example, FIG. 1 shows that WCD 102 may access a content server 122 through a packet-based network 124, such as the Internet.

Applications 114 may perform actions based on information received from tags 104. These actions may involve storing information, such as content entries and calendar events. Also, such actions may involve communicating with remote entities. For example, a particular application 114 may collaborate with communications module 112 to request and receive content from content server 122.

As shown in FIG. 1, WCD 102 further includes a display 116 and a keypad 118. These components allow a user to interact (e.g., exchange information) with WCD 102. These components are provided as examples. As alternatives or enhancements, WCD 102 may include other types of user interfaces. Such interfaces may include components such as a touch screen, a microphone, and/or speaker(s).

The tags shown in FIG. 1 include visual tags 104a-d, an RFID tag 104e, and an audio tag 104f. These tags may store information encoded according to an action language. In embodiments of the present invention, action languages are employed that advantageously reduce the capacity required to store such information.

Figure 2:
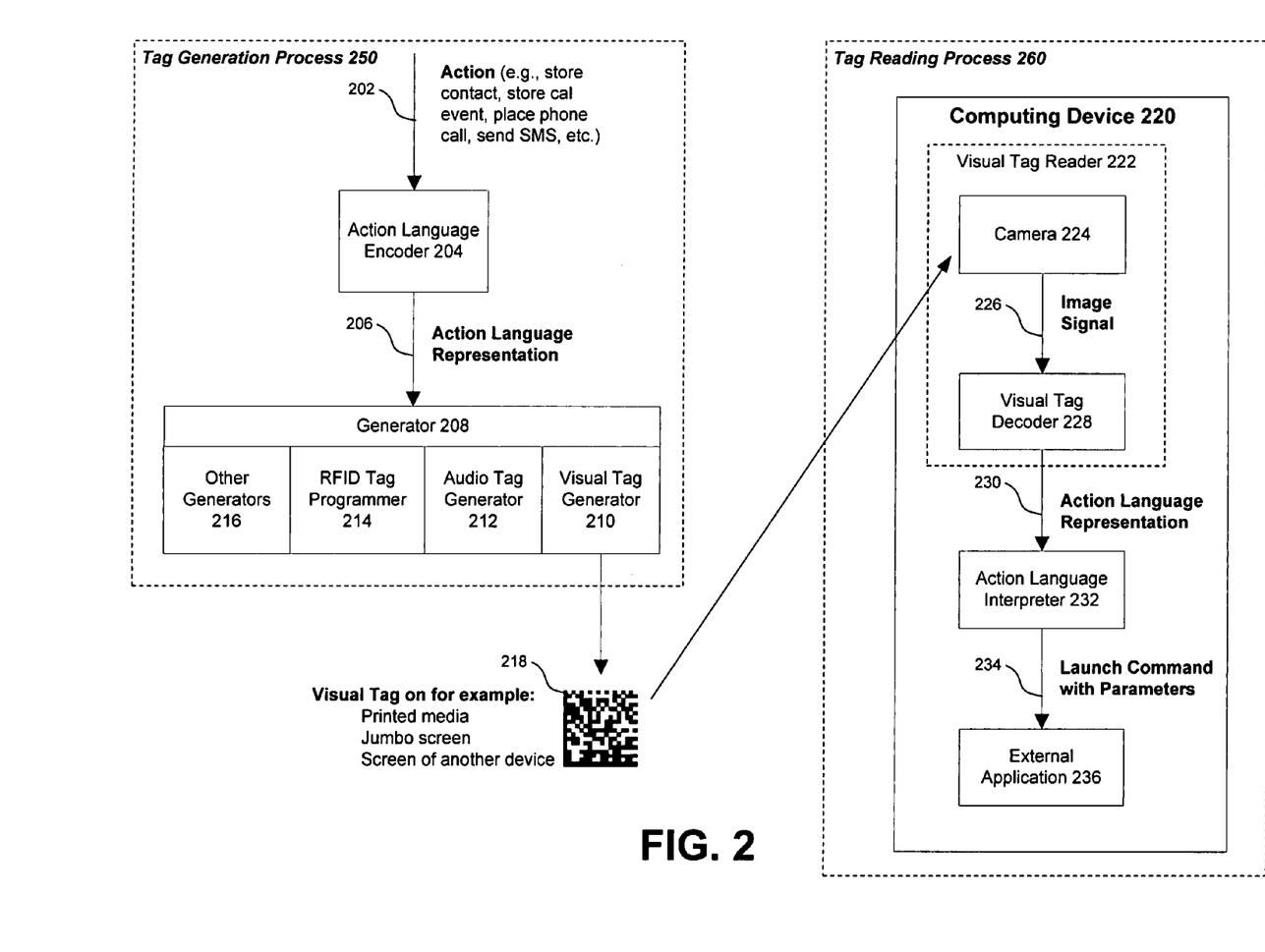
FIG. 2 is a diagram showing operations involving the generation and reading of tags.

FIG. 2 is a diagram showing operations involving the generation and reading of tags. These operations are shown in the context of a visual tag. However, such operations may be employed with other types of tags.

In particular, FIG. 2 shows a tag generation process 250 and a tag reading process 260. As shown in FIG. 2, process 250 commences with an action 202 that is input to an action language encoder 204. Action 202 may be various types of operations performed by a computing device 220. For instance, action 202 may be storing a contact entry, storing a calendar event, placing a phone call, accessing a web site, or sending a communication such as a short messaging service (SMS) message.

Action language encoder 204 employs an action language to encode action 202 into a representation that may be automatically identified by a computing platform or device. Accordingly, this representation may include one or more symbols such as bits. As shown in FIG. 2, action language encoder 204 generates an action language representation 206, which is sent to generator 208.

Generator 208 transfers action language representation 206 to a transmission medium. For instance, FIG. 2 shows that generator 208 includes a visual tag generator 210, an audio tag generator 212, an RFID tag programmer 214, as well as other encoders 216. For purposes of illustration, FIG. 2 shows visual tag generator 210 generating a visual tag 218 from action language representation 206.

As shown in FIG. 2, visual tag 218 is a two-dimensional barcode. However, other types of visual tags (such as one-dimensional barcodes) may be generated. Visual tag 218 may be placed on various media. For example, tag 218 may be printed on a tangible surface, such as paper or an adhesive label. Also, tag 218 may be engraved to a surface (such as metal). In addition, tag 218 may be placed on various electronic media, such as a jumbo screen, or a device display. Such devices include portable communications devices (e.g., WCD 102), computer workstations, or video display terminals.

Process 250 may be performed in various ways. For instance, encoder 204 and generator 208 may be implemented in various devices, such as a computer workstation, a wireless communications device, or other portable device. Actions may be received through the device's user interface (e.g., a keypad, a keyboard, or a touch screen) through manual data entry techniques.

In addition to tag generation process 250, FIG. 2 also shows tag reading process 260. In this process, a computing device 220 derives action language representation 206 from tag 218 and performs an action corresponding to this representation.

Computing device 220 may be a mobile communications device, such as WCD 102. Alternatively, computing device 220 may be, for example, a point-of-sale (POS) terminal, a computer workstation, or the like. FIG. 2 shows that computing device 220 includes a visual tag reader 222, an action language interpreter/executor 232, and an external application 236. However, in embodiments, computing device 220 may include multiple external applications 236.

Visual tag reader 222 includes an image sensor (i.e., a camera) 224 and a visual tag decoder 228. Image sensor 224 has a field of view. When visual tag 218 is within this field of view, image sensor 224 converts optical light energy, such as reflections, from tag 218 into an image signal 226. Visual tag decoder 228 converts this image signal into a symbol sequence 230. This sequence corresponds to (e.g., is identical to) action language representation 206. As shown in FIG. 2, interpreter/executor 232 receives sequence 230 and processes it according to techniques provided by the present invention.

As a result of this processing, a launch command 234 can be generated. Launch command 234 may include one or more parameters obtained or derived from parameters in symbol sequence 230. FIG. 2 shows that launch command 234 is sent to an external application 236. Application 236 performs one or more actions corresponding to the parameters in launch command 234.

II. Action Language

As described above with reference to FIG. 2, action languages are used to encode actions into representations for processing by computing platforms (such as mobile communications devices). These representations may be stored in formats, such as visual tags, barcodes, RFID tags, and audio streams. Examples of actions include storing a contact entry, storing a calendar event, sending a message, initiating a telephone call, and obtaining content/services from a remote provider. Accordingly, such actions (and their corresponding action language representations) may include one or more parameters. These parameters may be contained in fields, each field including an indicator and one or more corresponding parameters.

As discussed above, conventions such as VCard may be used to represent information for storage as contact entries. An exemplary VCard is shown below.

---

BEGIN:VCARD
VERSION:2.1
N:Smith;John;M.;Mr.;Esq.
TEL;WORK;VOICE;MSG:+1 (919) 555-1234
TEL;CELL:+1 (919) 554-6758
TEL;WORK;FAX:+1 (919) 555-9876
PHOTO;GIF;MIME:<<JOHNSMITH.part3.960129T083020.xyzMail@host3.com>
ADR;WORK;PARCEL;POSTAL;DOM:Suite 101;1 Central St.;Any Town;NC;27654
END:VCARD

---

VCards are typically transferred from one device to another. This transfer typically initiates an action to store a contact entry in the receiving device. VCards may include a plurality of parameters. For example, the VCard shown above includes nine fields, each containing various parameters. Three of these fields (begin, end, and version) pertain to formatting. The remaining fields convey name, telephone, photo, and address information.

Each of these VCard fields includes an indicator. As shown above, these indicators include one or more text strings separated by semicolons. A colon identifies the end of each indicator. A parameter may follow an indicator. The parameter may have multiple values separated by semicolons.

In a manner similar to VCards, VCals are used to encode information associated with calendar entries. VCals may be transferred from one device to another, typically initiating an action to store a calendar entry in the receiving device.

III. Efficient Action Language

In embodiments of the present invention, action languages provide for the compact and efficient representation of actions. To achieve such compactness and efficiency, various techniques may be employed. These techniques may include one or more of the following: using short identifiers, storing data in a compact format, using fixed data structures, and using references. These compression techniques are not exclusive. Rather, these techniques are complementary. Accordingly, any combination of these techniques (as well as others) may be employed in the encoding of an action language representation.

Figure 3:
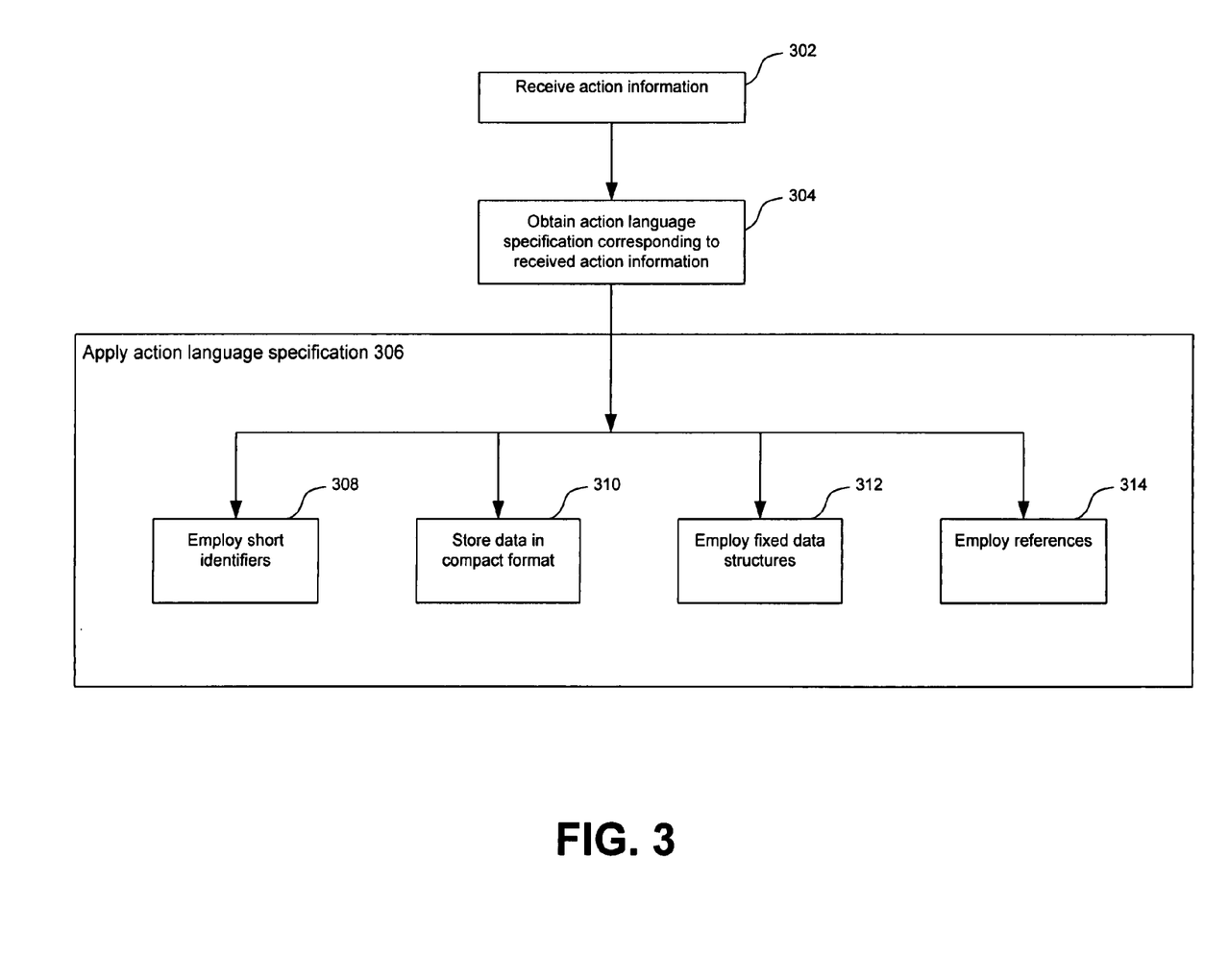
FIG. 3 is a flowchart illustrating an operation according to an aspect of the present invention.

FIG. 3 is a flowchart illustrating an operation according to an aspect of the present invention. In this operation, actions are encoded efficiently so that they may be expressed on limited capacity media, such as various types of tags. As shown in FIG. 3, this operation includes a step 302, in which action information is provided (or received). This information may include an action language specifier identifying the action type, and one or more parameter values. Next, a step 304 is performed. In this step, an action language specification corresponding to the action information is obtained.

The action language specification contains information (e.g., rules) regarding the manner in which parameters and other data are expressed in an encoded representation. Accordingly, in a step 306, the action language specification is applied to the information provided in step 302. This results in an action language representation of the action.

Various techniques may be employed to provide an efficient and compact action language representation. Therefore, step 306 may include performing one or more of steps 308-314. As shown in FIG. 3, short identifiers are used in step 308, data is stored using a compact format in step 310, fixed data structures are used in step 312, and references are employed in step 314. Combinations of these steps may be performed in parallel or in any sequence. Details regarding the techniques of these steps are now described.

A. Using Short Identifiers

Embodiments of the present invention identify fields using short identifiers such as binary numbers, instead of textual identifiers. An example of this compression technique is shown below (specifying a title in VCard and in an Efficient Action Language (EAL) approach of the present invention). In this example, a Latin character set is used. Also, the hexadecimal values listed in this example and the following examples (for example 0x07) each reserve only one byte of storage space, although the visual representation here in this application uses four characters.

| In VCard: | 'T' 'I' 'T' 'L' 'E' ':' 'M' 'a' 'n' 'a' 'g' 'e' 'r' |
|---|---|
| In EAL: | 0x07 'M' 'a' 'n' 'a' 'g' 'e' 'r' |

In the above example, "0x07" efficiently identifies a title field, as opposed to the more lengthy identifier 'T' 'I' 'T' 'L' 'E' that is employed by VCard. Also, in embodiments, identifiers shorter than 1 byte (or eight bits) may be used. This provides even greater space savings, but limits the number of unique identifiers and hence the number of separate fields.

B. Storing Data in a Compact Format

Aspects of the present invention store data in a compact format that is well suited for the data type. For example, instead of storing a telephone number as characters (the VCard approach), the telephone number may be stored as an integer value. The following is an example of such a technique.

| In VCard: | '+' '3' '5' '8' '5' '0' '1' '2' '3' '4' '5' '6' '7' '8' |
|---|---|
| In EAL: | 0x03 0x42 0xb3 0x63 0x2b 0x4e |

C. Using Fixed Data Structures

Using fixed data structures relies on the fact that some of the fields (for actions) may be mandatory, while others may be optional. According to embodiments of the present invention, the order (or location) of mandatory fields are fixed according to a predetermined scheme. This fixed ordering eliminates the need for identifiers to be provided with each mandatory field. An example of such a technique is provided below. This example (expressed in pseudo language), is a compact encoding of a store_calendar_event action. This action includes two mandatory parameters: event_description and event_start. Accordingly, these parameters do not require accompanying identifiers. However, this action also includes three optional parameters: event_end, event_alarm, and event_location. As shown below, these parameters are marked with corresponding identifiers, according to an embodiment of the present invention.

```
store_calendar_event =
    event_description,
    event_start,
    [event_end_id, event_end],
    [event_alarm_id, event_alarm],
    [event_location_id, event_location];
```

D. Using References

In embodiments of the present invention, an encoded action may provide definitions or predefined values. For example, in an action language representation for a store contact entry action, fields may provide the following definitions.

```
First name: Joe
Last name: Somebody
Company: TheCorp
```

Also, in embodiments, an action language may employ various references to provide for compression. For instance, a one-byte reference (e.g., 0x02) may be used to indicate the ".com" domain. Similarly, a one-byte reference (e.g., 0x16) may be used to provide a typical e-mail template, such as <first name>.<last name>@<company>=0x16. Accordingly, with such references, embodiments of the present invention advantageously allow for the e-mail address, Joe.Somebody@TheCorp.com, to be constructed with just two bytes (e.g., 0x16 0x02).

E. Example Representation of a Store Contact Entry Action

An example of a compressed representation of an action according to an aspect of the present invention is now described. In this example, the following original data is to be compressed into a compact representation for a store contact entry action.

```
FIRST NAME: Joe
LAST NAME: Somebody
...
TELEPHONE: +3585012345678
```

In embodiments of the present invention, both transmitting and receiving devices (also referred to as encoding and decoding devices) "know" (through software) that the first two fields in a contact information message are always first name and last name (in this order). The following fields are optional and might appear in an arbitrary order. Accordingly, compressing this information results in the following pseudo action language representation.

```
Joe
Somebody
...
T: 0x03 0x42 0xb3 0x63 0x2b 0x4e
```

In this representation, using fixed data structures has eliminated the use of identifiers for the first two fields. Also, in this pseudo action language example, using short identifiers has shortened the identifier for the telephone number field to be merely "T". Moreover, the corresponding telephone number parameter has been shortened by storing the parameter value in a compact format (i.e., as a corresponding hexadecimal representation).

Therefore, embodiments of the present invention provide rules for various types of actions (e.g., store contact entry). For example, a store contact entry action may be represented by a first field for a first name, a second field for a surname, and then a number of other fields in an arbitrary order.

A specifier (e.g., a header) of the action type may be provided in the action language representation. As soon as the decoding device recognizes the action type of the representation (store contact information, store calendar entry, store URL, access URL, send SMS, etc.), the device uses an appropriate rule set to decode the representation.

This rule set involves an action language specification. The action language specification contains information (e.g., rules) regarding the manner in which parameters and other data are expressed in an encoded representation. For example, such information may include the order of required fields and the format of their identifiers (e.g., short identifiers). In addition, such information may include compression indicators indicating how parameters are compressed for each field. Thus, in an encoding phase (such as in tag generation process 250), an action is compressed according to a specification. Conversely, in a decoding phase (such as in tag reading process 260), the action is identified (e.g., from a specifier) and the corresponding specification is followed to decode the action.

IV. Tag-Initiated Action

Figure 4:
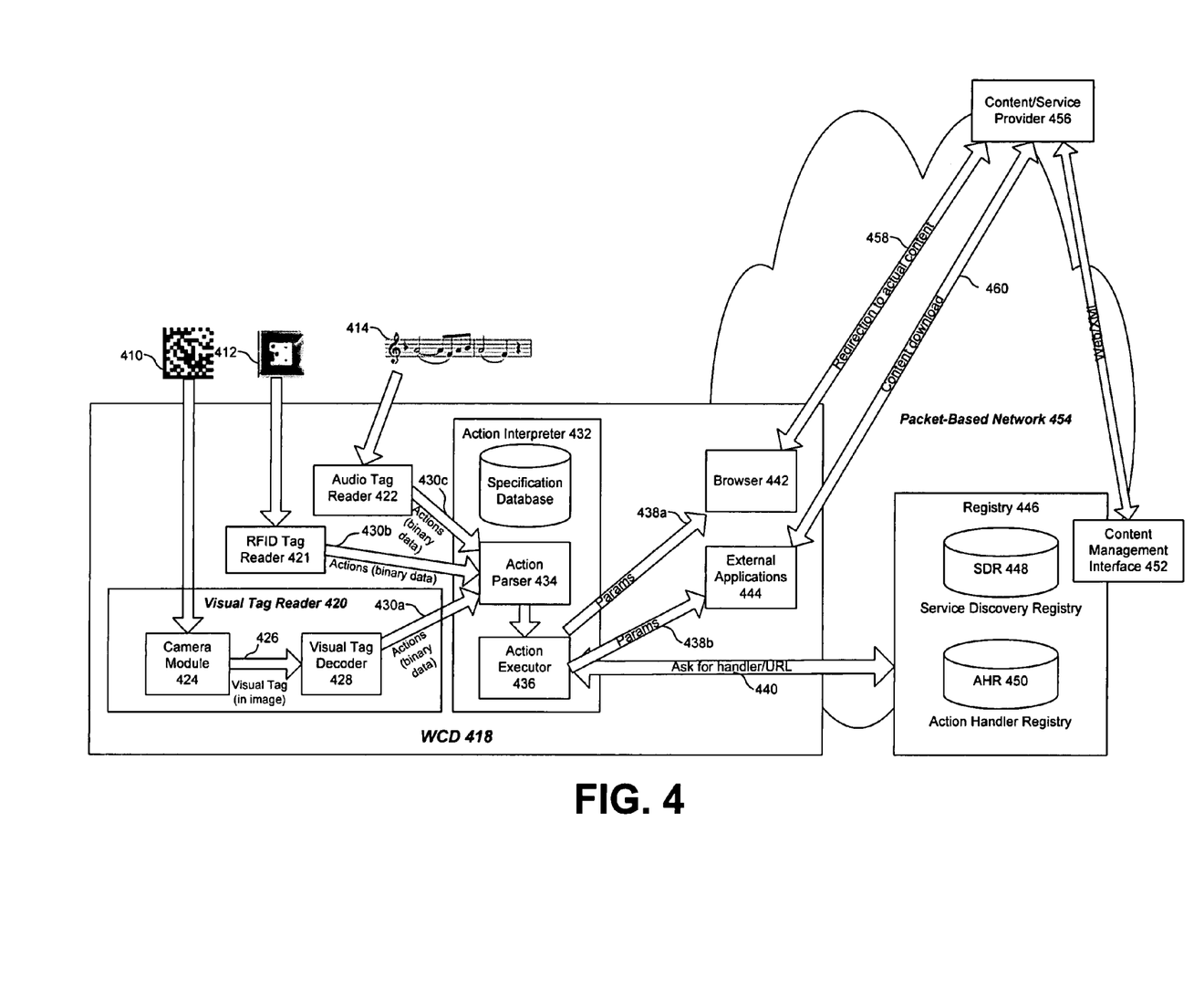
FIG. 4 is a diagram of a wireless communications device performing tag-initiated actions according to an embodiment of the present invention.

FIG. 4 is a block diagram showing a wireless communications device 418 performing tag-initiated actions. These actions may involve the retrieval of content and/or services from remote providers. However, these actions may merely involve processing by device 418 to perform operations, such as the creation and storage of contact entries or calendar events.

As shown in FIG. 4, such actions may be initiated by tags 410, 412, and 414. These tags are of different types. For instance, tag 410 is a visual tag. In contrast, tag 412 is a radio frequency identification (RFID) tag. Further, tag 414 is an audio tag. Also, there can be other types of tags that are each capable of relaying small amounts of information.

Device 418 can include one or more readers for these different types of tags. As shown in FIG. 4, these readers may include a visual tag reader 420, an RFID tag reader 421, and/or an audio tag reader 422. Each of these readers includes a sensor and a decoder. For instance, visual tag reader 420 includes a camera module 424 as its sensor, and a visual tag decoder 428. Camera module 424 has a field of view that, when oriented to cover visual tag 410, generates an image signal 426. This signal is sent to visual tag decoder 428 for processing.

Visual tag decoder 428 processes signal 426 and generates from it a sequence of symbols (e.g., binary bits) 430 that were expressed on visual tag 410. These symbols (also referred to as input binary data 430) are then sent to action interpreter 432.

Action interpreter 432 includes a specification database 433, a parser 434 and an action executor 436. Specification database 433 may be implemented with memory and includes one or more action language specifications. Parser 434 identifies actions and related fields and parameters from the input binary data 430. This identification is based on compression rules that are associated with one of the action language specifications stored in specification database 433. As a result, WCD 418 may perform one or more actions in accordance with these fields and parameters. These action(s) may be initiated directly by action parser 434. However, as an intermediate step, these actions may need further processing. Accordingly, parser 434 may send the parsed parameters to action executor 436 for translation into parameters that are readable by various applications.

FIG. 4 shows parameters 438a and 438b being sent from action interpreter 432 to various applications. These applications may include a browser 442, and one or more external applications 444. These applications may perform the one or more actions conveyed in action command(s) 430. In performing such actions, these applications may communicate with a remote content/service provider 456 across a packet-based network 454 (e.g., the Internet).

In particular, FIG. 4 shows a communication 458. During this communication, browser 442 receives content from a content server 456 (e.g., a web site or the like). Also, FIG. 4 shows a communication 460 in which an external application 444 receives a content download from content/service provider 456. Communications, such as communications 458 and 460, are based on the result of interpreting action data 430.

As described above, action executor 436 may process various parameters received from parser 434. This processing may include the translation of parameters as well as communications with remote entities across network 454 to receive parameters or a handler for an unknown action. For instance, FIG. 4 shows a communication 440, in which action executor 436 exchanges information with a registry server 446. This communication may involve executor 436 requesting a resource identifier (such as a URL) or an action handler for an action, which WCD 418 cannot handle.

In response, registry server 446 returns a corresponding resource identifier or action handler, which contains specification information (such as specification database 433) of the compression rules for the action in question as well as operating instructions for the action interpreter to carry out the action. The receipt of such information allows action executor 436 to send appropriate parameters to applications (e.g., opening a browser 442 with a content server URL as a parameter, and external applications 444). In turn, WCD 418 may perform actions, such as communications 458 and 460. These communications involve the downloading of content to device 418.

Figure 5:
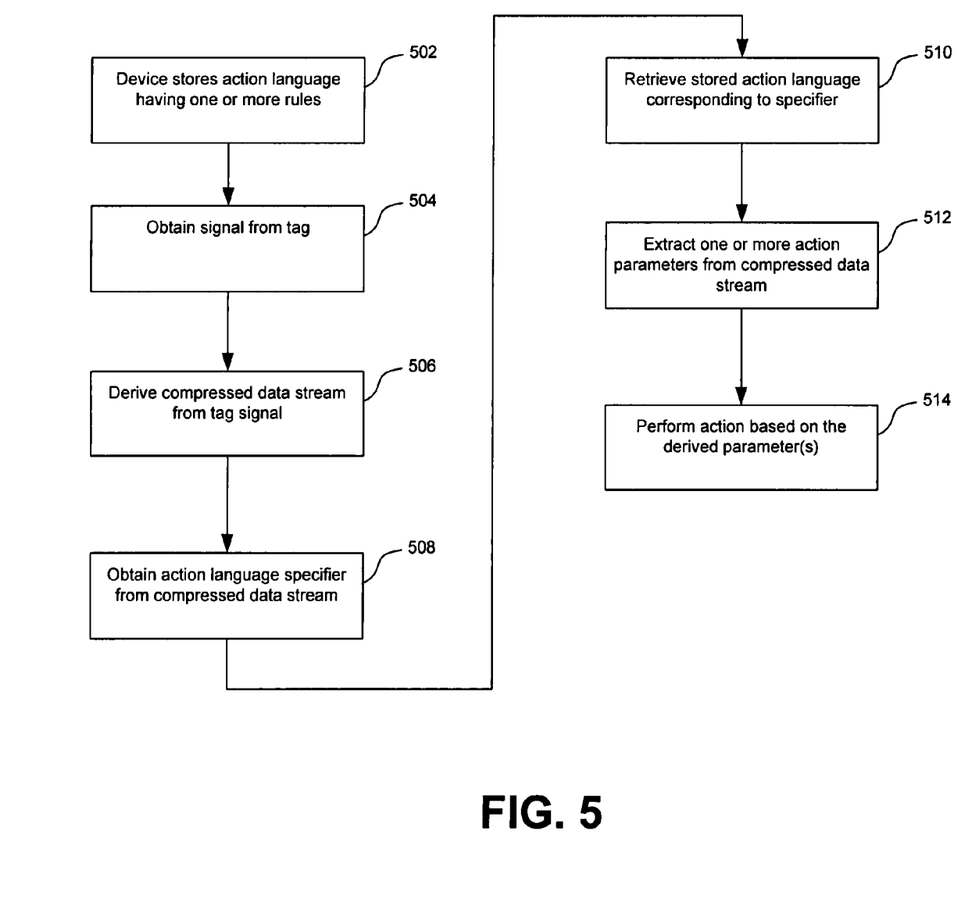
FIG. 5 is a flowchart showing an operation according to aspects of the present invention.

FIG. 5 is a flowchart of an operation according to embodiments of the present invention. This operation may be performed by various wireless communications devices, such as the devices of FIGS. 1, 2, and 4.

As shown in FIG. 5, this operation includes a step 502, in which a device stores one or more action language specifications. Each of these action language specifications has one or more rules. As described above, such rules may include using short identifiers, storing data in a compact format, using fixed data structures, and/or using references.

In a step 504, the device obtains a signal from a tag. Next, in a step 506, the device derives a compressed data stream from the signal. Steps 504 and 506 may be performed by a tag reader. For instance, when this operation involves a visual tag, a visual tag reader (e.g., visual tag reader 420) analyzes an image signal produced by an image sensor (e.g., camera module 424) to determine whether the image information corresponds to a visual tag. If so, then tag characteristics such as orientation, size, and distortions are determined. Based on this, the data stored in the visual tag is derived. With reference to FIG. 4, these steps may be performed by visual tag decoder 428.

When this operation involves an RFID tag, steps 504 and 506 may comprise receiving a wireless RF signal and demodulating it (e.g., using pulse width demodulation techniques) to derive the data stored in the RFID tag. However, when this operation involves an audio tag, steps 504 and 506 may comprise converting a sound into an analog signal and deriving the audio tag data through, for example, tone-based demodulation techniques.

FIG. 5 shows that an action language specifier is obtained from the compressed data stream in a step 508. This specifier indicates the type of action (e.g., store contact entry) to be used when decompressing the data stream. Accordingly, in a step 510, the device retrieves a stored action language specification that corresponds to the action language specifier.

In a step 512, one or more action parameters are extracted from the compressed data stream. This derivation employs the one or more rules of the retrieved action language.

In a step 514, the device performs an action based on the action parameter(s) extracted in step 512.

V. Device Implementation

The wireless communications devices described in connection with the present invention may be any number of wireless devices, such as wireless/cellular telephones, personal digital assistants (PDAs), or other wireless handsets, as well as portable computing devices capable of wireless communication. These devices utilize computing systems to control and manage the conventional device activity as well as the functionality provided by the present invention. Accordingly, hardware, firmware, software or a combination thereof may be used to perform the various functions and operations described herein. An example of a representative wireless communications device implementation capable of performing these functions and operations is shown in FIG. 6.

Figure 6:
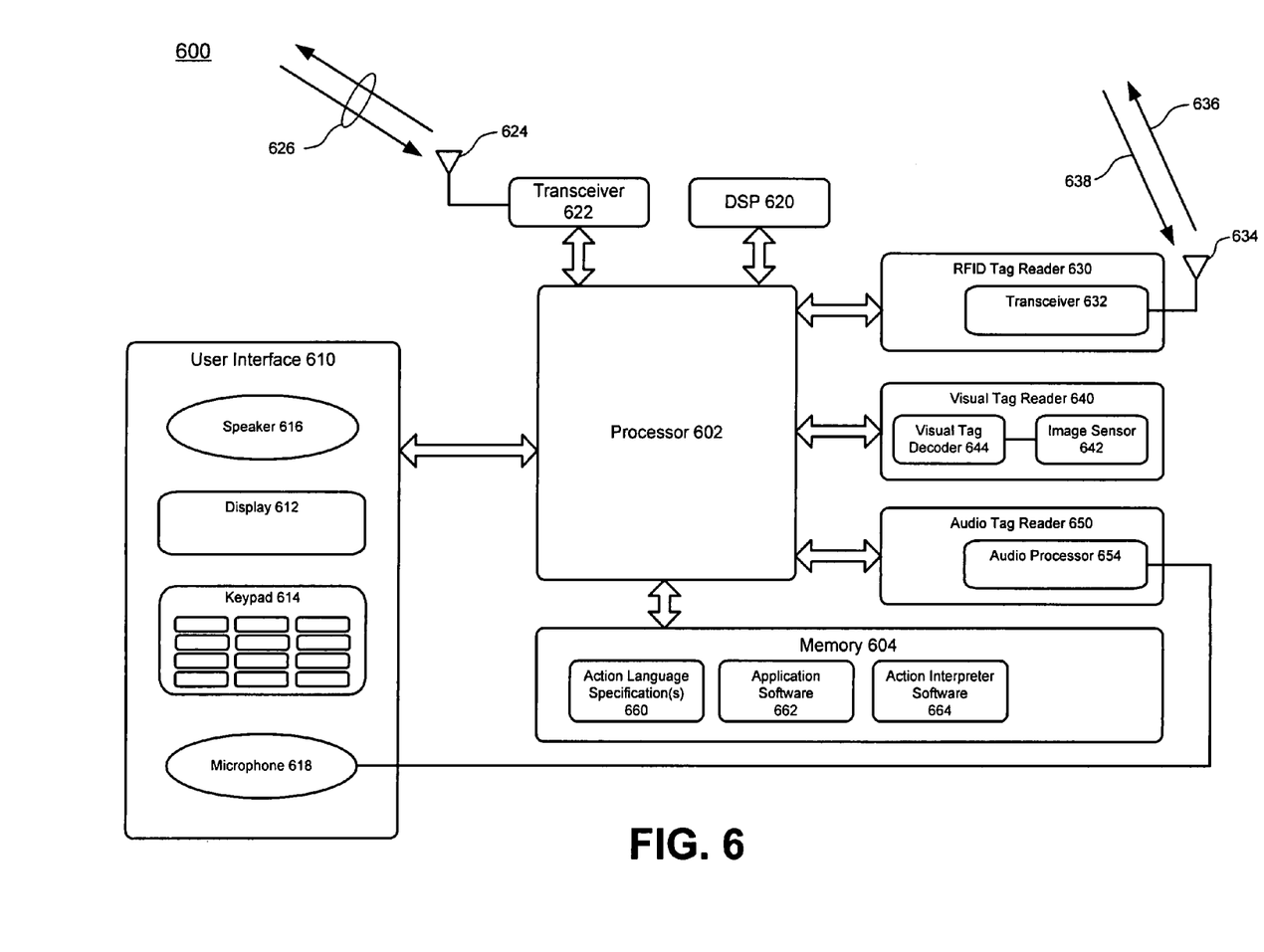
FIG. 6 is a diagram of an exemplary wireless communications device implementation.

FIG. 6 is a diagram of an exemplary wireless communications device implementation 600. This implementation includes a processor 602, such as a microprocessor, reduced instruction set computer (RISC), or other central processing module. Processor 602 need not be a single device, and may include one or more processors. For example, processing unit 602 may include a master processor and associated slave processors coupled to communicate with the master processor.

Processor 602 controls the basic functions of the wireless communications device in accordance with programs stored in a memory 604. Thus, processor 602 may perform functions associated with the encoding, decoding, and actions aspects of the present invention. More particularly, memory 604 may include an operating system and program modules for carrying out functions and applications in the device. For instance FIG. 6 shows that memory 602 stores application software 662, which includes instructions and data for applications, such as browser 442, external applications 444, and calendar and contact applications. Also, memory includes action interpreter software 664, may be used (through execution by processor 602) to implement action interpreter 432.

Memory 604 may also be used to store data. Accordingly, FIG. 6 shows that memory 604 stores one or more action language specifications 660.

Memory 604 may include one or more of read-only memory (ROM), flash ROM, programmable and/or erasable ROM, random access memory (RAM), subscriber interface module (SIM), wireless interface module (WIM), smart card, or other removable memory devices, etc. Such program modules may also be transmitted to wireless communications device implementation 600 via signals received from a network, such as the Internet and/or wireless communications networks. In one embodiment of the invention, data is stored in non-volatile electrically-erasable, programmable ROM (EEPROM), flash ROM, etc. so that it is retained when device power is lost.

Processor 602 is also coupled to a user-interface 610. As shown in FIG. 6, user-interface 610 may include, for example, a display 612 (e.g., a liquid crystal display and/or a touch screen), a keypad 614, a speaker 616, and a microphone 618. These and other user-interface components are coupled to processor 602 according to techniques known in the art. Keypad 614 includes alpha-numeric keys for performing a variety of functions, including dialing numbers and executing operations assigned to one or more keys.

Device implementation 600 may also include a digital signal processor (DSP) 620. DSP 620 may perform a variety of functions, including analog-to-digital (A/D) conversion, digital-to-analog (D/A) conversion, speech coding/decoding, encryption/decryption, error detection and correction, bit stream translation, filtering, etc.

A transceiver 622, through an antenna 624, exchanges RF signals 626 between the wireless device and remote entities via a network (not shown). This network may be, for example, a cellular or satellite telephony network. Also, this network may be a short-range (e.g., Bluetooth or WLAN) wireless communications network.

FIG. 6 shows that device implementation 600 includes an RFID tag reader 630, a visual tag reader 640, and an audio tag reader 650. These readers are coupled to processor 602 and allow device implementation 600 to receive encoded actions from remote tags.

RFID tag reader 630 includes a transceiver 632 and an antenna 634. Reader 630 transmits signals 636 which can be recognized by tags, thereby activating the tags. In response, the tags provide RF tag information signals 638 (e.g., action language representations). Transceiver 632 converts these signals into a data stream, which is provided to, for example, action interpreter 432.

As shown in FIG. 6, visual tag reader 640 includes an image sensor 642, such as a camera, and a visual tag decoder 644. Audio tag reader 650 includes an audio processor 654, which is used to convert an audio signal received from microphone 618 into a corresponding data stream. Audio processor 654 may be implemented in hardware, software, firmware, or any combination thereof. Accordingly, these components may include instructions stored in memory 604 and executed by processor 602 and/or DSP 620.

Implementation 600 is provided as a representative example of a computing environment in which the principles of the present invention may be applied. From the description provided herein, those skilled in the art will appreciate that the present invention is equally applicable in a variety of other currently known and future mobile computing environments.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hardwired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the features of the invention.

VI. Conclusion

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
    (a) storing one or more compression rules for an action language;
    (b) receiving a signal from a tag;
    (c) decoding from the signal a compressed data stream corresponding to the tag;
    (d) based on the one or more compression rules, deriving one or more action parameters from the compressed data stream; and
    (e) performing an action based on the one or more action parameters.

2. The method of claim 1, wherein the one or more compression rules includes at least one of: using short identifiers, storing data in a compact format, using fixed data structures, and using references.

3. The method of claim 1, wherein step (f) comprises communicating across a wireless communications network.

4. The method of claim 1, wherein step (f) further comprises obtaining content from a remote content provider.

5. The method of claim 1, wherein step (f) includes storing a contact entry.

6. The method of claim 1, wherein step (f) includes storing a calendar event.

7. The method of claim 1, wherein the tag is a radio frequency identification (RFID) tag.

8. The method of claim 1, wherein the tag is a visual tag.

9. The method of claim 1, wherein the tag is an audio tag.

10. A wireless communications device, comprising:

a tag reader configured to receive a signal from a tag and decode a compressed data stream from the signal;

a memory configured to store one or more compression rules for an action language;

an action interpreter configured to derive one or more action parameters from the compressed data stream based on the one or more compression rules, and an application configured to perform an action in accordance with the one or more action parameters.

11. The method of claim 10, wherein the one or more compression rules includes at least one of: using short identifiers, storing data in a compact format, using fixed data structures, and using references.

12. The wireless communications device of claim 10, wherein the tag reader is configured to receive the signal from a radio frequency identification (RFID) tag.

13. The wireless communications device of claim 10, wherein the tag reader is configured to receive the signal from a visual tag.

14. The wireless communications device of claim 13, wherein the tag reader comprises a camera.

15. The wireless communications device of claim 10, wherein the tag reader is configured to receive the signal from an audio tag.

16. The wireless communications device of claim 10, wherein the application is a personal contacts application, and the action includes storing a contact entry.

17. The wireless communications device of claim 10, wherein the application is a calendar application, and the action includes storing a calendar event.

18. The wireless communications device of claim 10, wherein the application is a browser application, and the action includes obtaining content from a remote content provider.

19. The wireless communications device of claim 10, wherein the action includes communicating across a wireless communications network.

20. A computer program product comprising a computer readable memory device having computer program logic recorded thereon for enabling a processor in a computer system of a wireless communications device, the computer program logic comprising:

program code for enabling the processor to store one or more compression rules for an action language; storing the compact representation in a tag to enable parsing the compact format using stored compression rules for the action language to identify actions and related fields and parameters.

21. A method, comprising:

(a) storing a plurality of action language specifications, each action language specification having one or more compression rules;

(b) receiving a signal from a tag;

(c) decoding from the signal a compressed data stream corresponding to the tag, the compressed data stream including an action language specifier;

(d) selecting among the stored action language specifications, an action language specification corresponding to the action language specifier;

(e) deriving one or more action parameters from the compressed data stream based on the selected action language specifications corresponding to the action language specifier; and (f) performing an action based on the one or more action parameters.

22. A method, comprising:

encoding an action into a compact representation according to an action language, wherein the action language employs one or more of using short identifiers, storing data in a compact format, using fixed data structures, and using references;

storing the compact representation in a tag to enable parsing the compact format using stored compression rules for the action language to identify actions and related fields and parameters.

23. An apparatus, comprising:

an encoder for encoding an action into a compact representation according to an action language, wherein the action language employs one or more of using short identifiers, storing data in a compact format, using fixed data structures, and using references; and a generator for storing the compact representation in a tag to enable parsing the compact format using stored compression rules for the language to identify actions and related fields and parameters.

24. The apparatus of claim 23, further comprising a memory that stores one or more action language specifications.

25. A tag, comprising:

a computer readable memory device;

a compact representation in said computer readable memory device, of an action according to an action language;

wherein the compact representation employs one or more of using short identifiers, storing data in a compact format, using fixed data structures, and using references to enable parsing the compact format using stored compression rules for the action language to identify actions and related fields an parameters.

* * * * *